United States Patent
Hoffman

(10) Patent No.: US 9,404,165 B2
(45) Date of Patent: Aug. 2, 2016

(54) PRODUCING OF PIG IRON FROM IRON-CONTAINING MATERIALS

(71) Applicant: Glenn E. Hoffman, Lancaster, SC (US)

(72) Inventor: Glenn E. Hoffman, Lancaster, SC (US)

(73) Assignee: HOFFMAN & SONS TECHNOLOGIES, LLC, Lancaster, SC (US)

( * ) Notice: Subject to any disclaimer, the term of this patent is extended or adjusted under 35 U.S.C. 154(b) by 0 days.

(21) Appl. No.: 14/353,102

(22) PCT Filed: Aug. 22, 2013

(86) PCT No.: PCT/US2013/056079
§ 371 (c)(1),
(2) Date: Apr. 21, 2014

(87) PCT Pub. No.: WO2014/031802
PCT Pub. Date: Feb. 27, 2014

(65) Prior Publication Data
US 2014/0331821 A1 Nov. 13, 2014

Related U.S. Application Data

(60) Provisional application No. 61/692,014, filed on Aug. 22, 2012, provisional application No. 61/718,510, filed on Oct. 25, 2012, provisional application No. 61/749,215, filed on Jan. 4, 2013.

(51) Int. Cl.
| | |
|---|---|
| *C21B 3/02* | (2006.01) |
| *C21B 13/00* | (2006.01) |
| *C21B 13/10* | (2006.01) |
| *C22B 1/245* | (2006.01) |
| *C21B 13/14* | (2006.01) |

(52) U.S. Cl.
CPC ............... *C21B 3/02* (2013.01); *C21B 13/0006* (2013.01); *C21B 13/006* (2013.01); *C21B 13/105* (2013.01); *C21B 13/143* (2013.01); *C22B 1/245* (2013.01); *C21B 2100/06* (2013.01); *Y02P 10/136* (2015.11); *Y02P 10/143* (2015.11); *Y02P 10/265* (2015.11); *Y02P 10/283* (2015.11)

(58) Field of Classification Search
CPC .. C21B 11/00; C21B 13/0006; C21B 13/008; C22B 1/16
See application file for complete search history.

(56) References Cited

U.S. PATENT DOCUMENTS

| | | | | | |
|---|---|---|---|---|---|
| 3,057,685 | A * | 10/1962 | Kamlet | ................... | C21B 15/00 423/145 |
| 4,685,964 | A * | 8/1987 | Summers | .............. | C21B 13/002 266/160 |
| 6,251,156 | B1 * | 6/2001 | Hoffman | ............... | C21C 5/5252 75/10.6 |
| 6,372,011 | B1 * | 4/2002 | Lehner | .................... | C21B 11/10 75/10.58 |
| 6,419,724 | B1 * | 7/2002 | Monteyne | ............... | C21B 11/06 266/168 |
| 6,685,761 | B1 * | 2/2004 | Hoffman | ................. | C21B 13/10 266/177 |
| 7,985,389 | B2 * | 7/2011 | Hoffman | ................. | C21B 11/10 423/594.17 |
| 2002/0005083 | A1 * | 1/2002 | Dimitrov | .............. | C21C 5/5252 75/10.25 |

* cited by examiner

*Primary Examiner* — George Wyszomierski
*Assistant Examiner* — Tima M McGuthry Banks
(74) *Attorney, Agent, or Firm* — Ralph H. Dougherty

(57) ABSTRACT

A process for recovering pig iron from iron-containing concentrates produced from iron-containing ores and sands by forming agglomerates and reducing them in a natural gas smelter, in which the process makes maximum utilization of heat created in and by the process.

18 Claims, 2 Drawing Sheets

PRODUCING OF PIG IRON FROM IRON-CONTAINING MATERIALS

CROSS REFERENCE TO RELATED APPLICATION

This application claims the benefit of: U.S. Provisional Application No. 61/692,014, filed 22 Aug. 2012; U.S. Provisional Application No. 61/718,510, filed 25 Oct. 2012; and U.S. Provisional Application No. 61/749,215, filed 4 Jan. 2013; as well as PCT Application No. PCT/US2013/056079, filed 22 Aug. 2013.

BACKGROUND OF THE INVENTION

A pyro-metallurgical process for treating iron ore concentrates and iron sands recovers pig iron as well as offers the potential for recovering titanium oxides from the slag. The method requires agglomeration of iron ore or iron sand concentrate with a suitable reductant (e.g., finely ground coal) to form compact agglomerates which are the feed material to a natural gas/oxygen enriched air fired smelting furnace, or a natural gas/oxygen fired furnace.

The agglomerates are melted to form hot metal, principally pig iron, with a slag containing oxides of titanium as well as other mineral species associated with the iron sands concentrate, gangue and coal ash. The hot metal is periodically tapped from the natural gas smelter and cast into solid pig iron to be reclaimed and sold as a merchant product. The slag is also periodically tapped from the smelter, quenched with water, and stockpiled. Slag produced from titania-containing iron concentrates can be subsequently processed to recover secondary $TiO_2$ product at a later point in time. The method of $TiO_2$ recovery from the slag incorporates a low to medium temperature process roast to convert the oxide specie to a compound (typically a chloride salt) that can be dissolved in a solvent (preferably water) and then subsequently precipitated as a pure solid using solvent extraction techniques.

The agglomerates can be either charged 'cold' to the natural gas smelter, or pre-heated in a agglomerate pre-heater and then charged 'hot' (up to 1200° C.). Process off-gas from the smelting furnace can be tempered and cleaned, either hot using a hot cyclone, or cooled to near ambient conditions using evaporative cooling methods or scrubbed using a direct contact water scrubber. Cleaned hot smelter off-gas can utilized directly in the pre-heater. Cool, cleaned smelter off-gas can be compressed and then utilized in the agglomerate pre-heater. Furthermore the agglomerate pre-heater fuel can either be 100% hot smelter off-gas, 100% natural gas, or some portion of natural gas that is mixed with the conditioned smelter off-gas (either hot or cooled). This results in achieving a high level of energy flexibility and efficiency for the overall process, thereby minimizing the OPEX (operational expenditure) utility cost (primarily natural gas), especially when site specific conditions for the commercial plant are considered. The spent exhaust gas from the agglomerate pre-heater retains sufficient temperature and sensible heat to act as the drying medium for drying the raw sand for the concentrating plant.

OBJECTS OF THE INVENTION

The principal object of the present invention is to provide an effective method for recovering pig iron from iron-containing feeds as iron ore concentrates produced from iron ore or iron sands.

Another object is that the source of smelting energy is supplied by the reaction of natural gas with oxygen or oxygen enriched air 'under' the molten iron bath maintained during the smelting operation so as to afford a very high level of heat transfer directly into the bath. This differs from other molten iron bath smelting technologies that require combustion of fuel with an oxidant in the space above the bath, and then transferring the resultant heat of reaction to the liquid bath.

Another object of this invention is to recover titanium oxides from slag produced from treatment of iron sands.

It is also an object of the invention to provide a plant for recovery of pig iron from iron-containing sands which makes maximum utilization of heat created by the process.

Another object of the invention is to provide a means for producing all the required electricity to accommodate the process and operate the plant in such manner as to be electricity self-sufficient.

BRIEF DESCRIPTION OF THE DRAWINGS

The foregoing and other objects will become more readily apparent by referring to the following detailed description and the appended drawings, in which.

DETAILED DESCRIPTION

Figure 1:
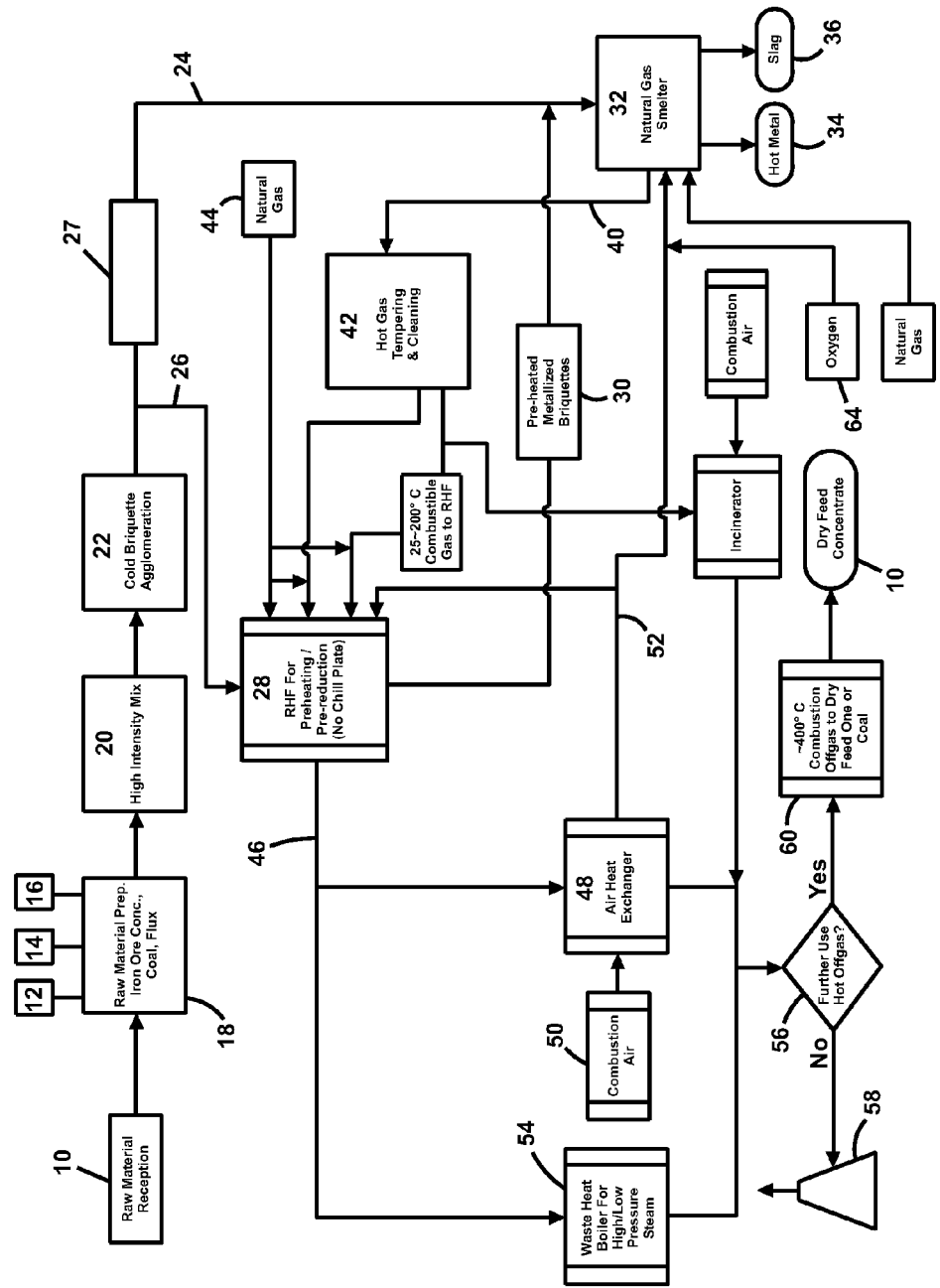
FIG. 1 is a schematic flowsheet of the process for recovering pig iron from the process of the invention.

The reference numerals in FIG. 1 refer to the following items:
10—iron-containing sands
12—prepared reductant, such as coal, coke, petroleum coke, char, peat, lignite, etc.,
14—fluxing agents—such as CaO, MgO, $CaF_2$, $Al_2O_3$, $SiO_2$, etc
16—binder such as cellulose, bentonite, molasses, starch—either organic or inorganic
18—raw material assembly
20—mixer
22—briquetter
24—conveyor to smelter
26—conveyor to pre-heater
27—agglomerates to smelter
28—preheater
30—hopper for preheated briquettes
32—natural gas smelter
34—hot metal
36—slag
40—hot off-gas conduit from smelter
42—melter off gas cooler-scrubber
44—natural gas
46—flue gas conduit from preheater
48—heat exchanger
50—source of combustion air
52—heated air—to preheater and smelter
54—waste heat boiler
56—collected hot off-gas
58—stack
60—raw material dryer
62—dry raw material
64—oxygen The invented method has the following steps:
1. Feed preparation and agglomeration of sized iron sand concentrate with sized carbon reductant and sized flux agents (if necessary) using an appropriate binder. The preferred agglomeration method is cold briquetting.

2. Feed briquetted agglomerates to a moving hearth pre-heater, such as a rotary hearth furnace (RHF) or a straight tunnel furnace that is fired by combustible fuel gas produced mostly from the smelting operation. Pre-heating of the charge, as well as pre-reduction of the iron oxide contained within the agglomerate, will result in a decrease of the smelter specific energy consumption.

3. Feeding pre-heated agglomerates to the natural gas smelter.

4. Heating the smelter charge by means of injecting natural gas with oxygen below the surface of the molten iron bath so as to produce carburized liquid iron, liquid slag and combustible off-gases. Oxygen enriched air can also be used as the 'oxidant' as either mixed into air or oxygen injected into the smelter bath with supplementary air introduced into the void space above the surface of the molten iron bath.

5. Tapping liquid carbon-containing pig iron from the smelter vessel on a periodic tap schedule.

6 Periodic tapping of liquid slag for granulation and downstream processing, or disposal. The expected concentration of $TiO_2$ in the slag produced when smelting titania containing iron feeds suggests economic viability for downstream recovery, but this is not a prerequisite for or essential to the process flow sheet.

7. Utilizing blended smelter and agglomerate pre-heater reduction off-gas as a low pressure combustible fuel for the indirect fired agglomerate pre-heater.

In summary, the method is basically a pyro-metallurgical treatment of an iron concentrate which eliminates any titanium and vanadium normally associated with concentrate material and promotes the production of high purity liquid hot metal or merchant pig iron that can be utilized in downstream steelmaking operations. The method has the features of either utilizing smelter off-gas for preheating the smelter charge, or generating electricity by combusting the high calorific value off-gas from the smelter using known gas turbine technology. Therefore, the method can produce some (and possibly all) of the electricity required by the plant. Thus the technology should qualify for carbon credits as well.

Referring now to FIG. 1, iron-containing concentrate 10 from iron ores or iron sands, along with prepared reductant 12, such as coal, coke, petroleum coke, peat, lignite, char, etc., fluxing agents 14, such as CaO, MgO, $CaF_2$, $Al_2O_3$, $SiO_2$, etc., and optionally a binder 16, such as cellulose, bentonite, molasses, starch—either organic or inorganic, are fed to a mixer 20 to form a briquetter feed mixture. Advantageously, the iron ore or sands are screened to pass 80 mesh Tyler Standard. Preferably, 100% of the iron-containing ores or sands pass 10 mesh Tyler Standard (1.70 mm); 100% of the carbonaceous reductant is minus 25 mm; and 100% of the fluxing agent is minus 25 mm.

The mixture is introduced to cold briquetter or agglomerator 22 in which cold briquettes are formed by agglomeration or cold pressing. The briquettes can be fed cold into the natural gas smelter 32, or they can be preheated in a preheater 28, which accomplishes some pre-reduction of the iron oxides in the briquettes, then fed into the smelter. Either cold or preheated briquettes or agglomerates, or both cold and preheated agglomerates, can be fed to the natural gas smelter 32, which refines the iron-containing feed materials. As an alternative, iron ore and reductant can be fed independently to the smelter without any agglomeration step. Slag 36 is drawn off from the smelter, and pig iron 34 is tapped periodically. Tapping of the pig iron is done on an intermittent basis, as is removal of the slag. It is advantageous to prevent all incidental air ingress to the melting furnace by providing a pressure seal, not shown.

The preheater 28 can be a rotary hearth furnace, or alternatively can be a tunnel furnace through which moving grates pass, or which may incorporate trays on a straight grate or other means for conveying the briquettes through the pre-heater. Sand seals can be provided for the tunnel furnace to maintain and preserve the proper atmosphere. The preheater operates at a temperature range of about 750-1200° C., and the briquette residence time is 15 to 40 minutes. The preheater actually accomplishes pre-reduction of the iron values in the briquettes, with metallization ranging from about 35% to about 90% depending on the operating temperature and the residence time.

Figure 2:
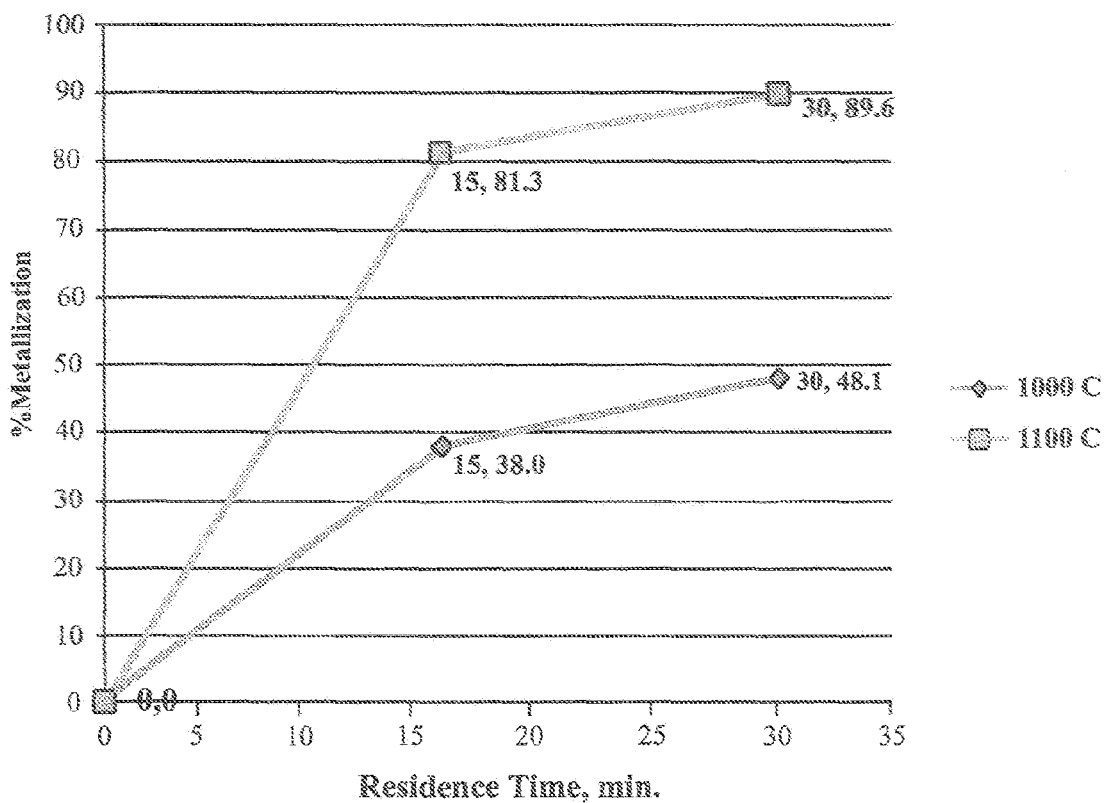
FIG. 2 is a chart showing a data plot of the reduction kinetics for the iron sands at one location.

Referring now to the data plot of FIG. 2, excellent metallization (~90%) has been achieved at 1100° C. after a residence time of 30 minutes and a respectable 81% metallization after just 15 minutes residence time. This is excellent kinetics at relatively low temperatures. The process works well even at about 50% metallization. The lower the temperature of the pre-heat/pre-reduction step, the less stress on the equipment. Operating at these temperatures with a rotary hearth furnace preheater requires no chill plate. This allows the process to use a small rotary hearth, which has a very positive impact on CAPEX (capital) costs.

The hot reduced DRI briquettes are discharged from the pre-heat furnace 28 at a high temperature, preferably about 1,100 to 1,200° C., and then conveyed to a storage/buffer hopper 30 and then finally metered into the natural gas smelter by a feeding system, not shown (lock hoppers/wiper bar/etc.).

Hot off-gas 40, which contains combustible gases CO and $H_2$, is removed from smelter 32 at a temperature ranging from 400 to 1,600° C. The combustible-containing gas is preferably cleaned, modified and/or tempered to a temperature of from about ambient (about 100° C.) to about 1,500° C. in cooler-scrubber 42, then used as the heating gas in preheater 28. Natural gas from source 44 may be added to the hot fuel gas 40, if desired. Alternatively, natural gas from 44 or cleaned gas from 42 may be used as the sole fuel for preheater 28. Flue gas 46, which exits the preheater 28 at a temperature of about 1000 to 1200° C., is utilized in a heat exchanger 48 to preheat additional air to a temperature of about 40 to 1000° C. for the preheater or the smelter 32, or both. Flue gas 46 is also used in a waste heat boiler 54 for the production of high and low pressure steam. Off-gas from both the heat exchanger 48 and the waste heat boiler 54 is collected at 56. Unwanted hot off-gas can be delivered to venting stack 58, but preferably the collected off-gas is used in raw material dryer 60 to dry the raw iron-containing feed material 10 before delivering the dried feed material to the mixer 20.

Off-gas exiting the waste heat boiler 54 and the heat exchanger 48 may be compressed in a high pressure compressor and used as combustion fuel in a gas turbine which drives a generator to produce electricity. Sensible heat contained in any hot off-gas in the process may be recovered in a waste heat recovery boiler system. The waste heat boiler system steam cycle could be a "Kalina" cycle based on using 70% ammonia and 30% water for better range processing and heat recovery efficiency at lower gas temperatures. Ammonia/water boiling occurs over a range of temperatures rather than at a specific temperature and pressure. Steam produced by the waste heat boiler system is then used to drive a steam turbine and generator to produce electricity. One of the objectives realized by the invention is to produce most of the required electricity to accommodate the process and operate the plant so as to be nearly electricity self-sufficient.

Waste off-gas is collected from each location in the process where it is emitted, and is combusted in a stack such as stack 58 to convert carbon monoxide and hydrogen to carbon dioxide and water vapor.

ALTERNATIVE EMBODIMENTS

Alternatively, if natural gas is not available or is too costly, then the smelter can produce all the required "fuel" for the pre-heater either by feeding a mixture of cold briquettes and about 80% metallized hot direct reduced iron (DRI) feed to the smelter 32, or by running the preheater (RHF) 28 in such manner to produce DRI with a very low average metallization, preferably in the range of 25-40% metallization. This makes the smelter essentially a "gasifier" that produces liquid hot metal.

In another alternative embodiment, the preheater 28 could be a rotary kiln. The scrubber-cooler 42 could be a direct contact water scrubbing system.

SUMMARY OF THE ACHIEVEMENT OF THE OBJECTS OF THE INVENTION

From the foregoing, it is readily apparent that I have invented an improved process for recovering pig iron from iron-containing concentrates produced from iron ore or iron sands in a gas-based smelter more effectively than heretofore, as well as a plant and apparatus for recovery of pig iron from iron-containing ores and sands which makes maximum utilization of heat created by the process.

What is claimed is:

1. A method for producing pig iron by direct processing of iron-containing feed materials, comprising the steps of:
    a. mixing iron-containing feed materials, carbonaceous reductant, and a fluxing agent to form a mixture;
    b. cold forming agglomerates from said mixture;
    c. preheating and pre-reducing at least a portion of said agglomerates to a temperature of 750 to 1200° C., and introducing said preheated agglomerates to a natural gas smelting furnace having a molten iron bath therein;
    d. heating and melting the agglomerates at a temperature of from 1300 to 1760° C. injecting natural gas with oxygen below the surface of the molten iron bath within the smelting furnace and forming hot metal with a slag thereon;
    e. removing the slag; and
    f. tapping the hot metal as pig iron.

2. A method according to claim 1, further comprising forming a combustible off-gas in the natural gas smelting furnace, removing the off-gas and recovering the heating value from the off-gas from the smelting furnace.

3. A method according to claim 1, wherein the iron-containing feed materials are iron ore concentrates or iron sands.

4. A method according to claim 1, further comprising screening the iron-containing feed materials to pass 80 mesh Tyler Standard.

5. A method according to claim 1, further comprising introducing a binder into said mixture.

6. A method according to claim 5, wherein the binder is selected from the group consisting of cellulose, bentonite, molasses, starch or mixtures thereof.

7. A method according to claim 1, further comprising preventing substantially all incidental air ingress to the smelting furnace by providing a pressure seal.

8. A method according to claim 1, further comprising forming off-gases in the smelting furnace, removing the off-gases therefrom, cleaning and cooling the removed off-gases, and utilizing the cleaned off-gases to preheat the preheated portion of the agglomerates.

9. A method according to claim 8, wherein the removed off-gases from the smelting furnace are cooled to a temperature of from about 100° C. to about 1,500° C.

10. A method according to claim 1 wherein fuel for preheating the agglomerates is selected from the group consisting of natural gas, cleaned and cooled off-gas from the smelting furnace, or a combination thereof.

11. A method according to claim 1, wherein:
    100% of the iron-containing teed materials pass 10 mesh Tyler Standard (1.70 mm);
    100% of the carbonaceous reductant is minus 25 mm; and
    100% of the fluxing agent is minus 25 mm.

12. A method according to claim 1 wherein the carbonaceous reductant is selected from the group consisting of coal, coke, petroleum coke, and char.

13. A method according to claim 1, wherein the fluxing agent is selected from the group consisting of CaO, MgO, $CaF_2$, $SiO_2$, $Al_2O_3$, and mixtures thereof.

14. A method according to claim 1, further comprising maintaining a reducing atmosphere within the natural gas smelting furnace.

15. A method according to claim 1, further comprising recovering hot off gases from the preheating step, and passing them through a waste heat boiler to form steam, and utilizing the steam to drive a steam turbine and/or a generator to produce electricity.

16. A method according to claim 1, wherein the preheating step is conducted in a rotary hearth furnace, a tunnel furnace, or a rotary kiln.

17. A method according to claim 1, further comprising introducing a portion of said agglomerates to the smelting furnace as cold charge.

18. A method according to claim 1 wherein the smelting furnace is selected from the group consisting of a natural gas/oxygen enriched air fired smelting furnace, and a natural gas/oxygen fired furnace.

* * * * *